(12) United States Patent
Eakin

(10) Patent No.: US 8,245,145 B1
(45) Date of Patent: Aug. 14, 2012

(54) TOOL AND METHOD FOR DEVELOPING A WEB PAGE

(76) Inventor: Douglas M. Eakin, Fremont, CA (US)

(*) Notice: Subject to any disclaimer, the term of this patent is extended or adjusted under 35 U.S.C. 154(b) by 772 days.

(21) Appl. No.: 12/313,851

(22) Filed: Nov. 25, 2008

Related U.S. Application Data

(60) Provisional application No. 61/008,090, filed on Dec. 18, 2007.

(51) Int. Cl.
*G06F 3/00* (2006.01)
*G06F 3/048* (2006.01)
(52) U.S. Cl. ......... 715/760; 715/762; 715/764; 715/765
(58) Field of Classification Search .................. 715/760, 715/762, 764, 765
See application file for complete search history.

(56) References Cited

U.S. PATENT DOCUMENTS

| | | | |
|---|---|---|---|
| 7,085,693 B2* | 8/2006 | Zimmerman | 703/6 |
| 7,855,811 B2* | 12/2010 | Silverbrook et al. | 358/403 |
| 7,973,957 B2* | 7/2011 | Dodge et al. | 358/1.15 |
| 2005/0281437 A1* | 12/2005 | Fruchter et al. | 382/113 |
| 2006/0007189 A1* | 1/2006 | Gaines et al. | 345/179 |

* cited by examiner

*Primary Examiner* — Nicholas Augustine
(74) *Attorney, Agent, or Firm* — Ted Masters

(57) ABSTRACT

A tool and method for developing a web page includes a sheet which is the same shape as the screen upon which the web page will be displayed. The sheet has a usable area which has a grid. Web page elements are hand drawn on the usable area. The sheet also has an unusable area which represents the area taken up by elements of the web browser. The hand drawn elements provide immediate layout feedback based on the size of the grid. The hand drawn sheet is then imported into web development software to effect the web page development process. In an embodiment of the invention, a plurality of sheets are contained in a tear-off pad.

4 Claims, 5 Drawing Sheets

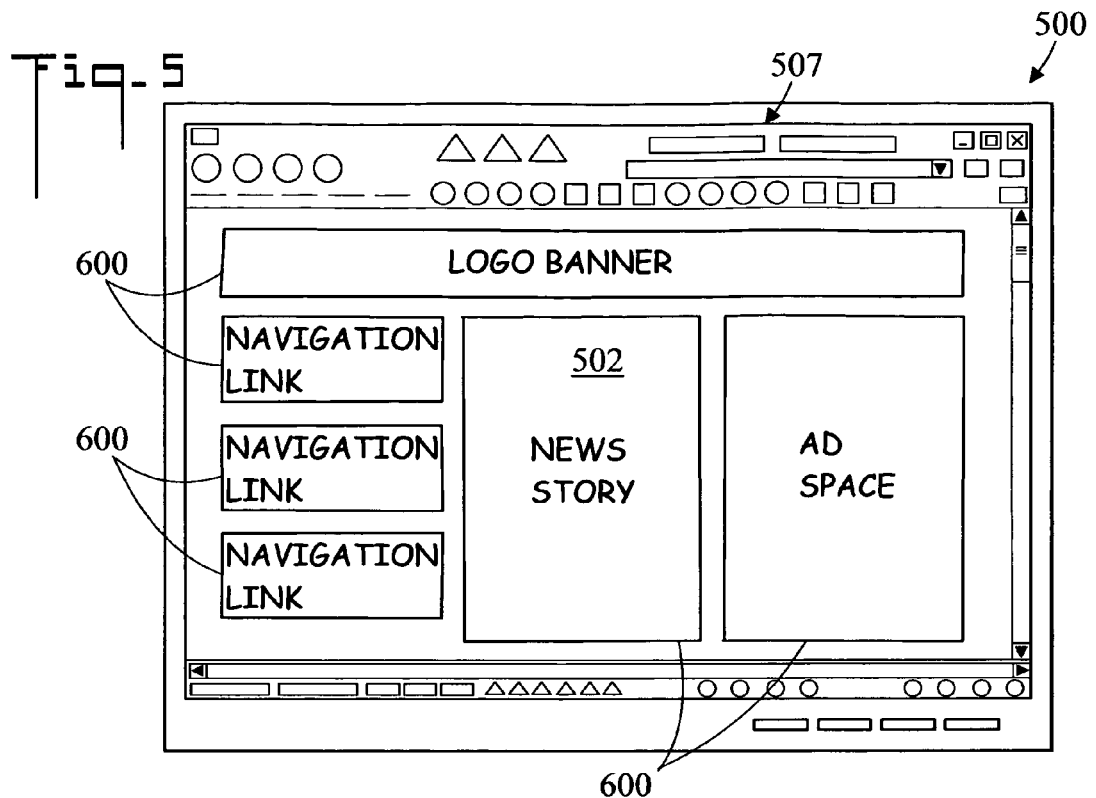
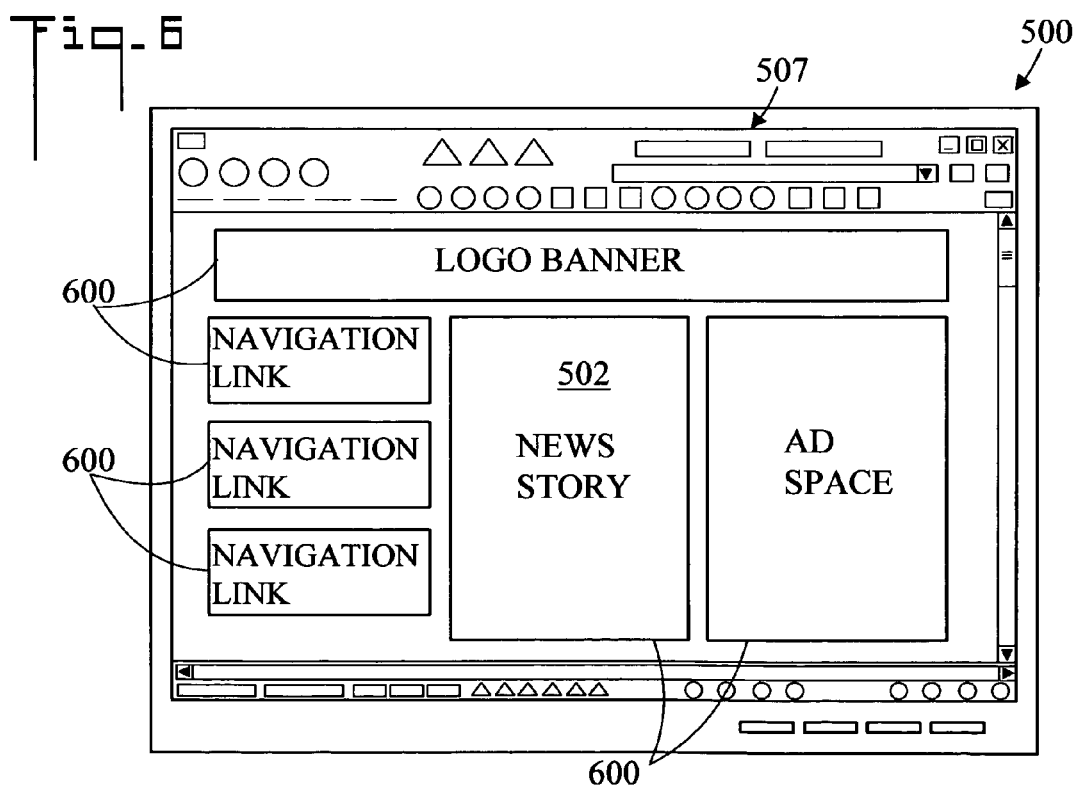

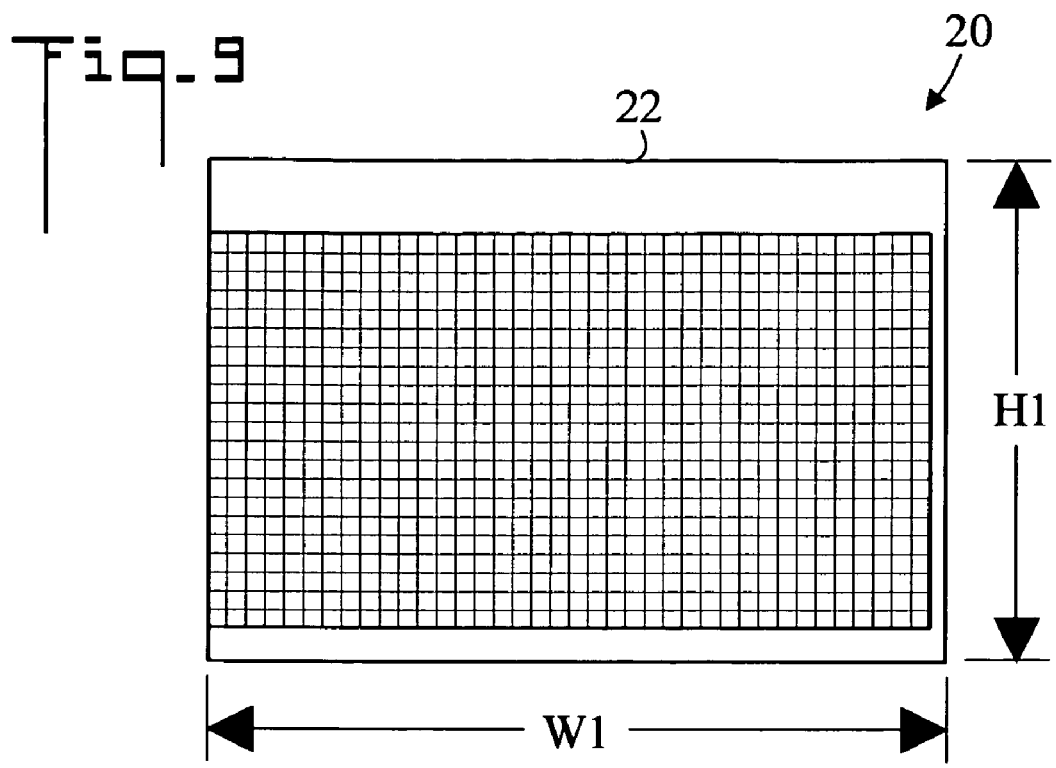
Fig_9
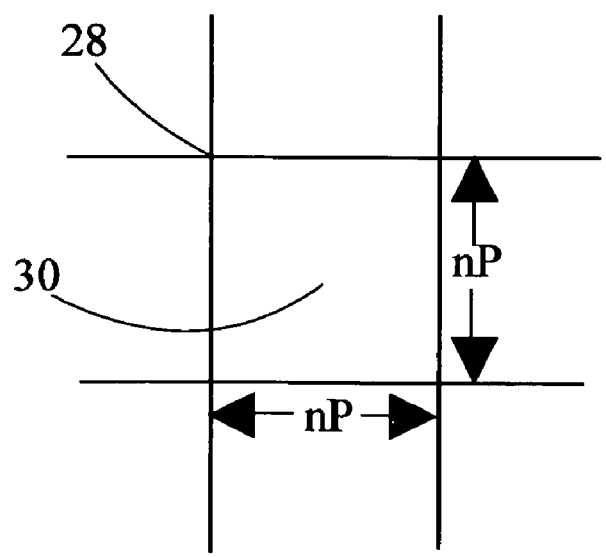
Fig_10

TOOL AND METHOD FOR DEVELOPING A WEB PAGE

CROSS REFERENCE TO RELATED APPLICATION

This application claims the filing benefit under 35 U.S.C. §119(e) of U.S. Provisional Application No. 61/008,090, filed Dec. 18, 2007, which is herein incorporated by reference.

TECHNICAL FIELD

The present invention pertains generally to web page design and development, and more particularly to a tool and method for developing a web page.

BACKGROUND OF THE INVENTION

Many people prefer to initially create ideas on paper. In the case of web page (also webpage) design and development, the process can be started by drawing a site layout on paper. Many times web page designers simply draw their ideas on paper to get their concepts onto a viewable media. This allows for a simple communication of thoughts. The sketch could be a rough idea (as shown) or more detailed.

However, several problems can occur in doing so. First, the size of the paper can be different than the size of the screen. Second, it is not clear what the exact dimensions of the drawn objects were for re-creating that object on a computer screen. And third, the browser window would then alter the viewable work that could be seen without scrolling.

The present invention is directed to a tool and method for developing a web page. The present invention overcomes the aforementioned problems by providing a pad which contains a plurality of tear off gridded sheets which are designed to represent the actual computer screen dimensions or a scaled version thereof. The present invention will help web page and web site developers by providing a realistic depiction of the finished product using simple drawing tools such as pencils and pens.

In the method of the present invention, the web page developer draws the desired web page layout on a sheet from the pad. The sheet is then scanned and imported into a web development computer program where the objects drawn on the sheet are used to create a tracing layer for facilitating the further development of the web page. The present invention provides an immediate and realistic depiction of the finished web page by allowing the team/developer to see how the objects will fit onto a standard computer screen and what size those objects will be. That work is then scanned to capture a digital version for creating the actual site. The sheet also has areas blocked off where there is unusable space due to web browser elements. While in a preferred embodiment of the invention the sheet with drawn web page elements is scanned into a web development computer program, it may be appreciated that the present invention can also be used without the scanning process. That is, the sheet can simply be used as a sketching tool for obtaining immediate feedback on element sizing and layout.

The sheets (and pad) will come in various sizes to represent the different size computer screens which may be used. Each sheet of the pad consists of a page of paper which has the same shape as the computer screen, and in an embodiment is the same size as the computer screen. The sheet clearly distinguishes between the usable space, and the unusable space (margins etc.) which is occupied by web browser elements. The grid is set with each square having the dimension of for example 10 pixels by 10 pixels. This allows an easy measurement of the web objects.

The tool can be used by a web page developer or by a team of people collaborating together on a development. That team could include a client whose feedback is valuable to the design. During the design and development process, a pencil or pen is used to quickly mark areas on the grid to represent elements on the web page. Since many people prefer to create ideas with paper and pen, this would free the developer from having to think about using the computer at this time. If a pencil is used, the ideas could be quickly and easily altered with an eraser. By having the sheet represent the area available at one moment on the screen, it will be quickly evident if scrolling is necessary to see all of the elements on the web page. The grid has squares with the dimension of each square being a number of pixels (e.g. 10 pixels by 10 pixels).

In accordance with a preferred embodiment of the invention, a tool is provided for developing a web page for display on the screen of a visual display unit. The screen has a size, a shape, and a plurality of pixels. A web browser is displayable on the screen, the web browser having (1) a web page display area, and (2) a control and display area. The tool includes a sheet which has a shape which is equal to the shape of the screen. A usable area is disposed on the sheet, the usable area corresponding with the web page display area of the web browser. An unusable area is also disposed on the sheet. The unusable area corresponding with the control and display area of the web browser.

In accordance with an aspect of the invention, the usable area includes a grid having a plurality of grid elements. Each grid element is shaped and dimensioned to correspond to a predetermined number of pixels.

In accordance with another aspect of the invention, each grid element is ten pixels high by ten pixels wide.

In accordance with another aspect of the invention, the sheet has a size which is equal to the size of the screen.

In accordance with another aspect of the invention, a plurality of sheets are combined to form a pad, wherein each sheet is removable from the pad.

Other aspects of the present invention will become apparent from the following detailed description, taken in conjunction with the accompanying drawings, which illustrate, by way of example, the principles of the invention.

BRIEF DESCRIPTION OF THE DRAWINGS

FIG. 5 is a front elevation view of the prior art visual display unit showing an electronic file representing the drawn web page elements displayed by web development software;

FIG. 6 is a front elevation view of the prior art visual display unit showing the web page developed by the web development software from the electronic file representing the drawn web page elements;

FIG. 9 is a top plan view of a reduced version of the tool; and,

FIG. 10 is an enlarged view of area 10 of FIG. 3.

DETAILED DESCRIPTION OF THE INVENTION

Figure 1:
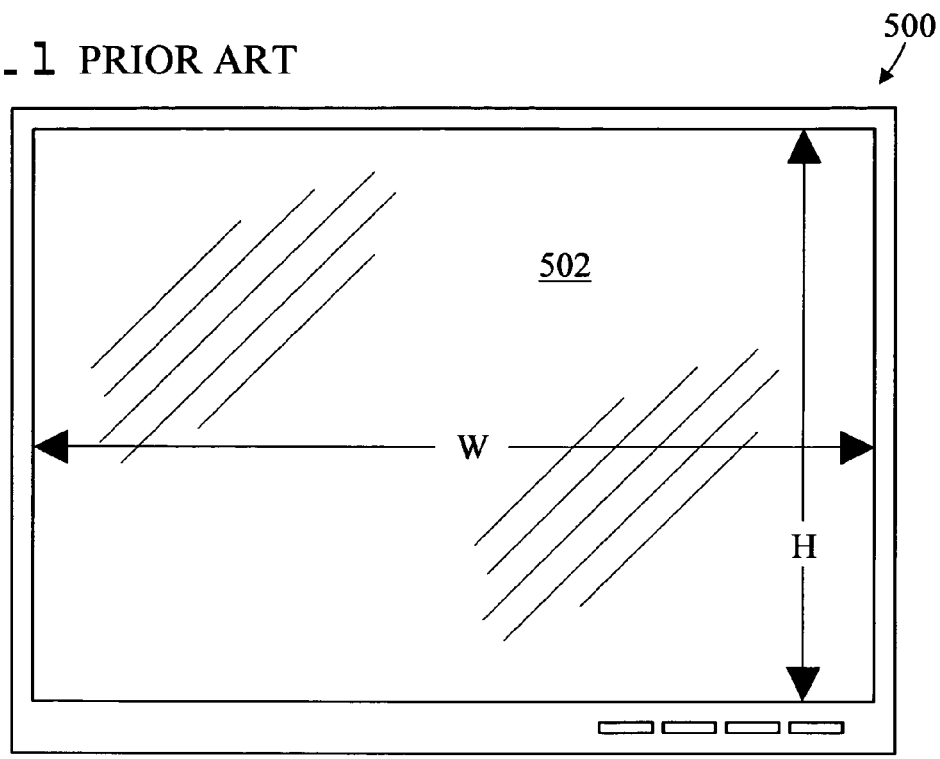
FIG. 1 is a front elevation view of a prior art visual display unit.

Referring initially to FIG. 1, there is illustrated a front elevation view of a prior art a visual display unit 500, often called a monitor or display. Visual display unit 500 is typically connected to and driven by a computer, and includes a screen 502 which has a size, a shape (aspect ratio), and a plurality of pixels (picture elements). Screen 502 has a height H and a width W.

Figure 2:
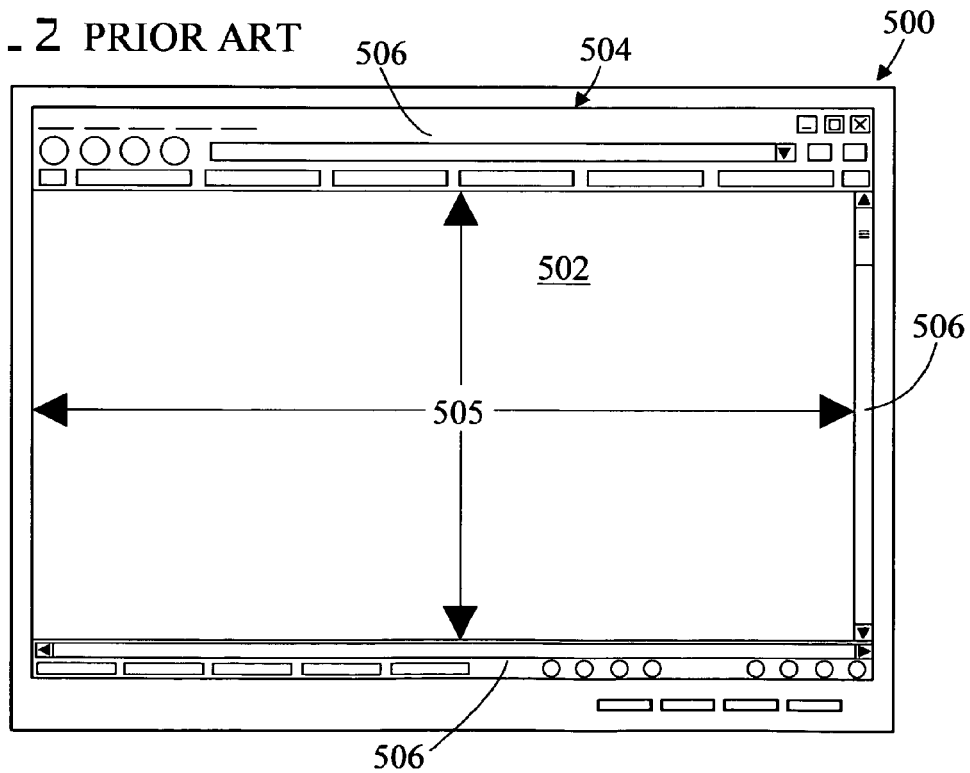
FIG. 2 is a front elevation view of the prior art visual display unit with a web browser displayed on its screen.

FIG. 2 is a front elevation view of prior art visual display unit 500 with a web browser 504 displayed on its screen 502. Web browser 504 is a software application program which allows a user to display and interact with a network such as the world wide web (e.g. Netscape®, Internet Explorer®, and the like). Web browser 504 includes (1) a web page display area 505, and (2) a control and display area 506. Web page display area 505 is the area in which a web page is displayed, and is the large white area in FIG. 2. Control and display area 506 includes the controls and displays which are used to operate web browser 504. Control and display area 506 is typically located at the top, bottom, and side(s) of web browser 504. It is noted that in FIG. 2, the right portion of control and display area 506 is a scroll bar.

Figure 3:
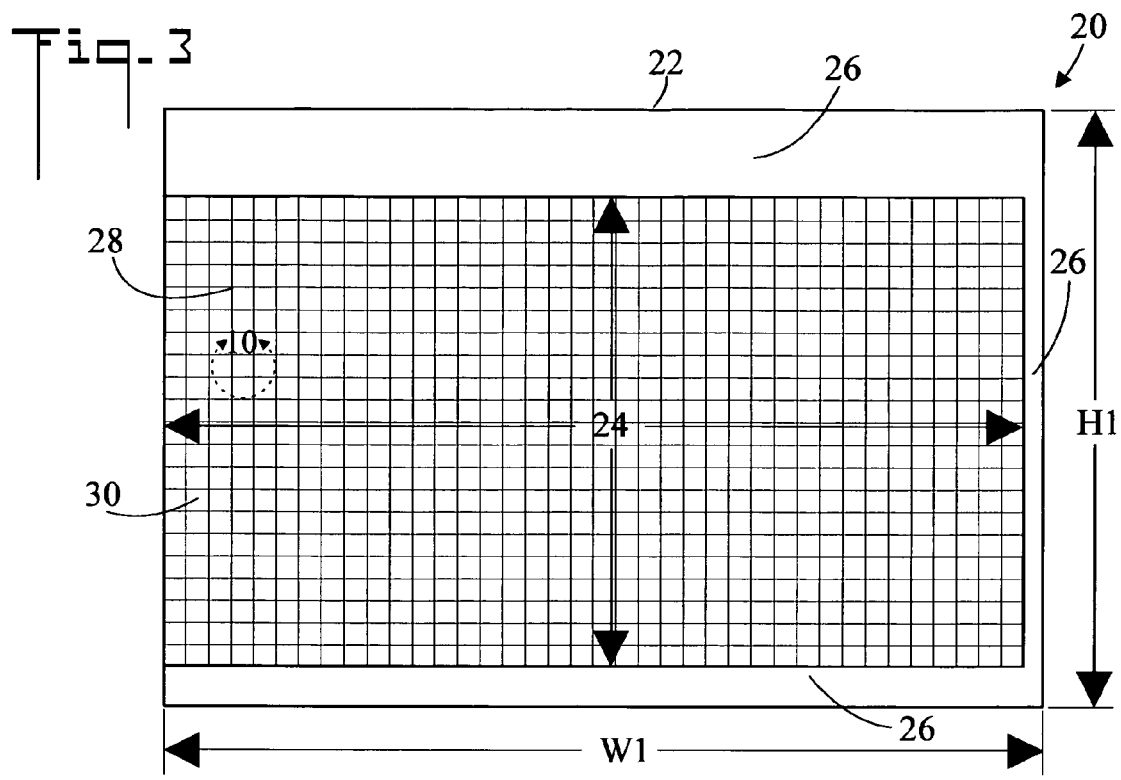
FIG. 3 is a top plan view of a tool for developing a web page for display on a computer screen in accordance with the present invention.

FIG. 3 is a top plan view of a tool for developing a web page for display on computer screen 502 in accordance with the present invention, the tool generally designated as 20. Tool 20 includes a sheet 22 which has a height H1 and a width W1. Sheet 22 has a shape which is equal to the shape of screen 502, as defined by the relationship H1/H=W1/W. In the shown embodiment, sheet 22 has a size which is equal to the size of screen 502 (i.e. H1=H, and W1=W). However, it may be appreciated that sheet 22 could be smaller or larger than screen 502 and still be the same shape as screen 502 (refer to FIG. 9 and the associated discussion). The shape of sheet 22 is selected to accommodate the shape (aspect ratio) of a particular screen 502. As such, different shaped screens 502 will require different shaped sheets 22. In the shown embodiment, sheet 22 is a sheet of paper.

A usable area 24 is disposed on sheet 22, and corresponds with the web page display area 505 of web browser 504 (refer to FIG. 2). Usable area 24 is the area which is available for drawing web page elements (refer to FIG. 4 and the associated discussion). Usable area 24 also includes a grid (refer to the discussion below). A unusable area 26 is also disposed on sheet 22, and corresponds with control and display area 506 of web browser 504. Unusable area 26 is not available for drawing web page elements. Usable area 24 and unusable area 26 are separate and distinct from one another, and are so displayed on sheet 22. In the shown embodiment of FIG. 3, usable area 24 includes a grid, and unusable area 26 is white and does not include a grid. It may also be appreciated that the usable 24 and unusable 26 areas could be different from those depicted in FIG. 3, so long as the usable area 24 represents the area that is available for drawing web page elements, and the unusable area 26 represents the area that is taken up by web browser elements, and is therefore not available for drawing web page elements.

Usable area 24 includes a grid 28 having a plurality of grid elements 30 Each grid element 30 is shaped and dimensioned to correspond to a predetermined number of pixels (refer to FIG. 10 and the associated discussion). Grid 28 is used as a guide in drawing web page elements on sheet 22. In FIG. 3 it is noted that grid 28 and grid elements 30 are not necessarily drawn to scale.

Figure 4:
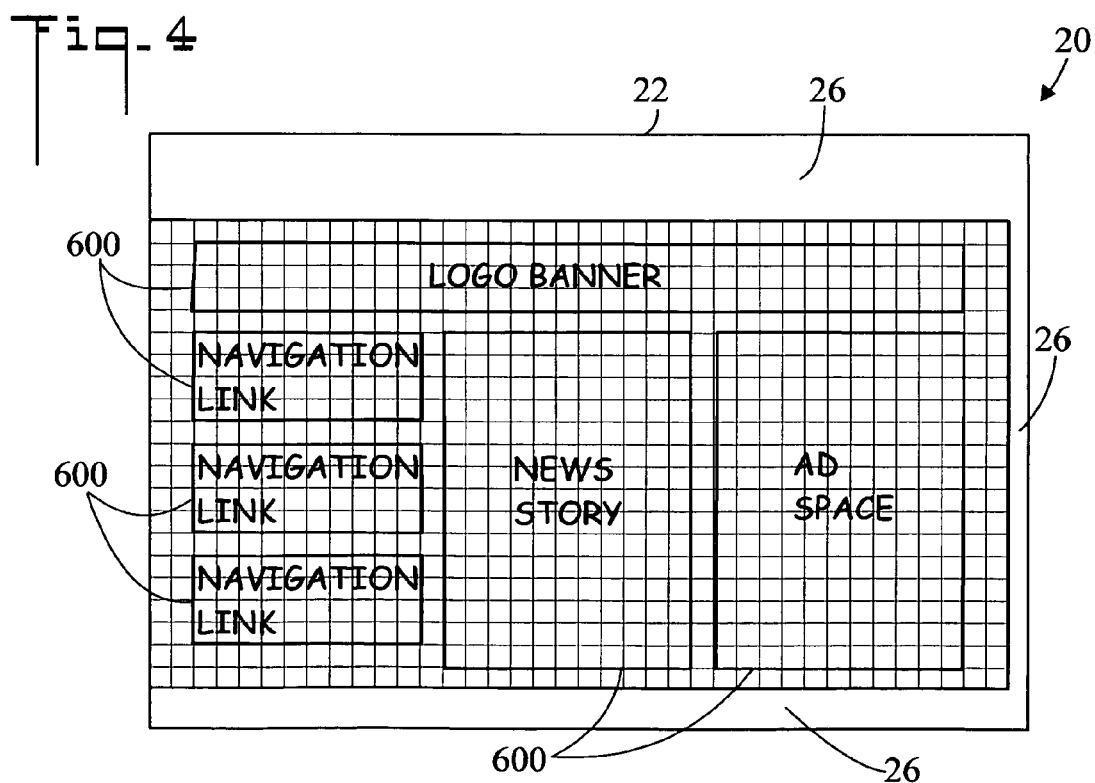
FIG. 4 is a top plan view of the tool with web page elements drawn thereon.

FIG. 4 is a top plan view of tool 20 with web page element (s) 600 drawn thereon. Web page elements 600 comprise a collection of desired web page features which are drawn freehand on sheet 22 using a pen or pencil. In the shown example, web page elements 600 are LOGO BANNER, NAVIGATION LINK, NEWS STORY, and AD SPACE. The web page elements 600 are drawn on usable area 24 using grid 28 as a guide during the drawing process. It may be appreciated that one sheet 22 is used for each web page that is developed, and as such a plurality of sheets 22 are typically required to develop the collection of web pages which typically comprise an entire web site.

FIG. 5 is a front elevation view of visual display unit 500 showing an electronic file representing the drawn web page elements of FIG. 4 displayed by web development software 507. The web development software 507 display is shown on screen 502 of visual display unit 500. A scanner (not shown) is used to convert the web page elements 600 of FIG. 4 to an electronic file. The electronic file is then imported into the web development software 507. In an embodiment of the invention, the electronic file is used as a background tracing layer in the web development software 507.

FIG. 6 is a front elevation view of visual display unit 500 showing a web page developed by the web development software 507 from the electronic file representing the drawn web page elements 600. The web development software 507 has been used to place the web page elements 600 in a final format (as indicated by the standard font rather than the hand printed font).

Figure 7:
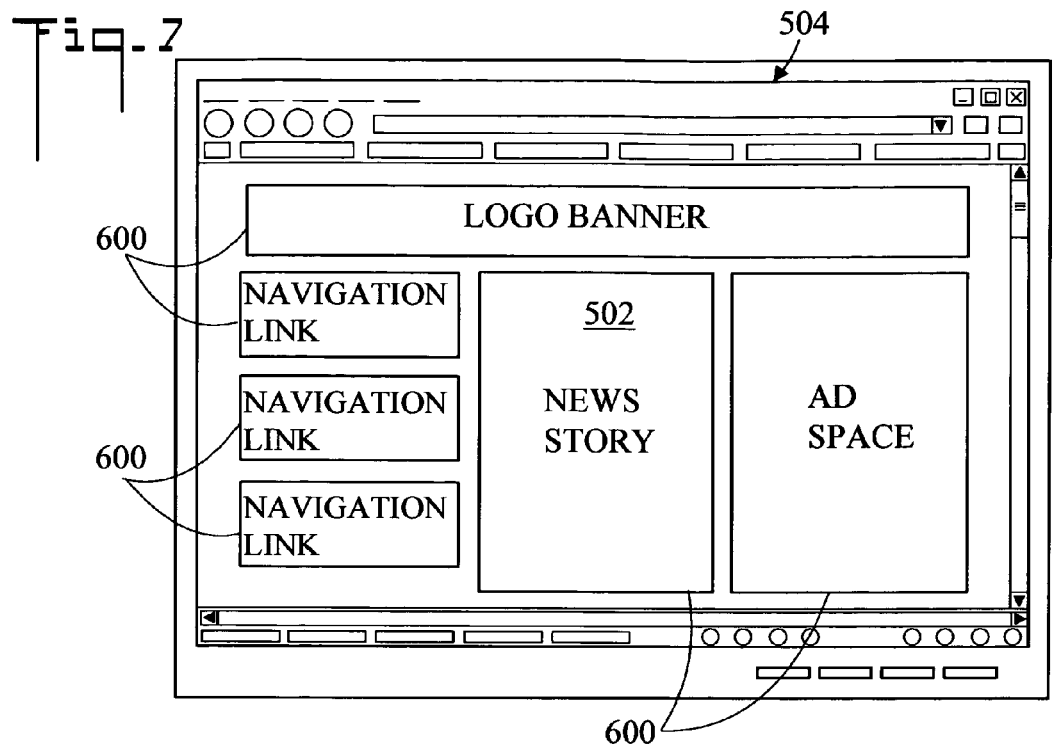
FIG. 7 is a front elevation view of the resultant web page displayed on the screen.

FIG. 7 is a front elevation view of the resultant final web page displayed on screen 502 by web browser 504.

It may be appreciated that the visual display unit 500 of FIGS. 2, and 5-7 can be the same unit, or alternatively could be different units (e.g. one unit for developing the web page, and another unit for displaying the final web page).

Figure 8:
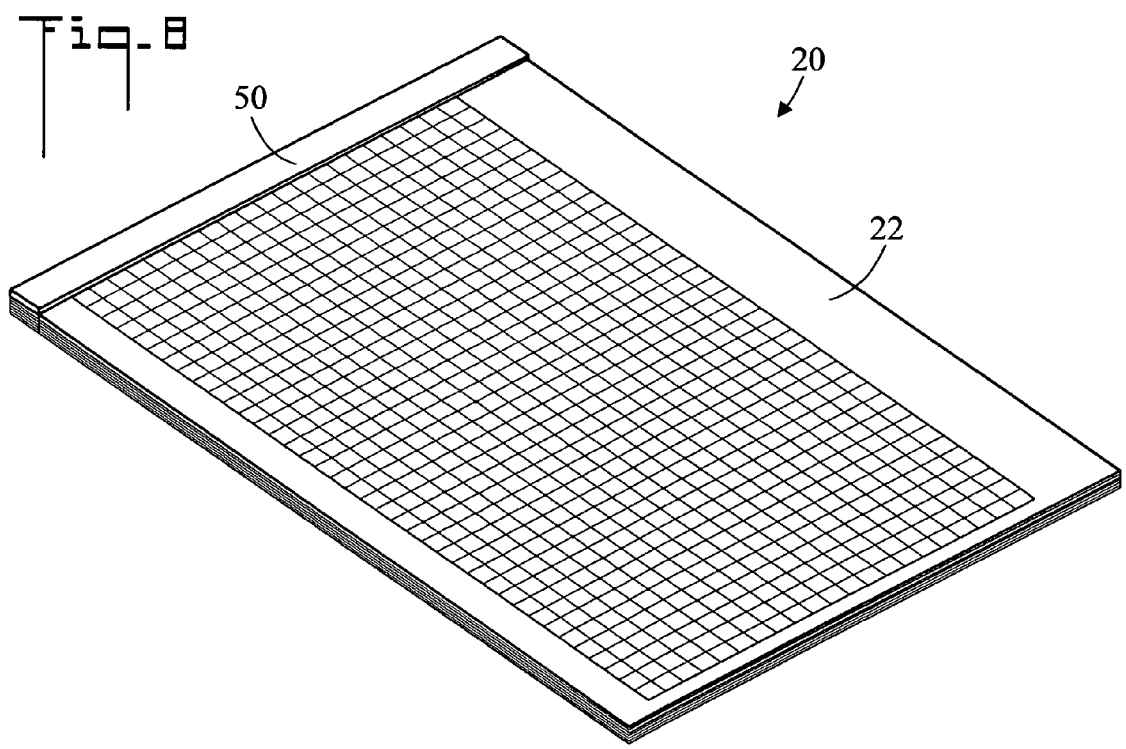
FIG. 8 is a perspective view of a plurality of sheets combined to form a pad.

FIG. 8 is a perspective view of a plurality of sheets 22 combined to form a pad 50, wherein each sheet 22 is removable from pad 50 in conventional tear-off fashion. That is, sheets 22 have a perforated edge so that the top sheet 22 may be removed from pad 50.

FIG. 9 is a top plan view of a reduced version of tool 20. In this embodiment sheet 22 is not the same size as screen 502 (refer to FIG. 1), but is rather scaled down. It is noted however that sheet 22 is still the same shape as screen 502. In this embodiment, the electronic file representing sheet 22 and web page elements 600 is scaled up in the web page development software 507 during web page development (refer also to FIG. 5).

FIG. 10 is an enlarged view of area 10 of FIG. 3. Grid 28 forms grid elements 30, and each grid element 30 corresponds to a predetermined number of pixels nP. For example, each grid element 30 could be ten pixels high by ten pixels wide (i.e. nP=10). A pixel is the smallest element of an image that can be individually processed in a video display system. Pixel size will vary with screen size and resolution. Thus, a 19 inch diagonal computer screen set at SVGA resolution will have a pixel size of 0.377 mm. So in this case, a line that is 10 pixels long would then have a length of 3.77 mm, which is each side of a square on the grid.

In terms of use, a method for developing a web page includes: (refer to FIGS. 1-10)

(a) providing a visual display unit 500 having a screen 502, screen 502 having a size, a shape, and a plurality of pixels, a web browser 504 displayable on screen 502, web browser 504 having a (1) a web page display area 505, and (2) a control and display area 506;
- (b) providing an image scanner;
- (c) providing web development software 507;
- (d) providing a tool 20 for developing a web page for display on screen 502, tool 20 including;
  - a sheet 22;
  - sheet 22 having a shape which is equal to the shape of screen 502;
  - a usable area 24 disposed on sheet 22, usable area 22 corresponding with web page display area 505 of web browser 504; and,
  - an unusable area 26 disposed on sheet 22, unusable area 26 corresponding with control and display area 506 of web browser 504;
- (e) drawing at least one web page element 600 on usable area 24 of sheet 22 and not on unusable area 506 of sheet 22; The user freehand draws the desired web page elements 600 on the usable area 24 of sheet 22 (refer to FIG. 4). After entering all desired web page elements 600, the user gets a realistic depiction of what the finished web page will look like on the screen 502 since it is the same shape as the screen 502, and the area of the screen 502 lost to browser elements is depicted as unusable area 26 on sheet 22. Also, since each grid element 30 (square) on the grid 28 is a predetermined number of pixels nP (e.g. 10 pixels by 10 pixels), web page elements 600 drawn on sheet 22 are easily measured.
- (f) using the scanner to convert the at least one web page element 600 to an electronic file;
- (g) importing the electronic file into the web development software 507; After step (f) in which sheet 22 with the drawn web page elements 600 is scanned into a convenient file format (e.g. JPEG), the electronic file is then imported into commercially available web development software 507 such as Dreamweaver® or the like. In an embodiment of the invention, the electronic file is imported as a background tracing layer into the web development software 507 (refer to FIG. 5).
- (h) using the web development software 507 to develop the web page. From this point the web development software 507 is used to develop the web page, wherein objects are laid over the tracing layer formed by the present invention to create the actual web site. The present invention facilitates the creative process of web page development by allowing the user to quickly create concepts on paper without the complex process of manipulating images on a computer screen.

The method further including:
in step (d), usable area 24 including a grid 28 having a plurality of grid elements 30; and,
each grid element 30 shaped and dimensioned to correspond to a predetermined number of pixels nP.

The method further including:
each grid element 30 being ten pixels high by ten pixels wide.

The method further including:
in step (d), sheet 22 having a size which is equal to the size of screen 502.

The method further including:
in step (d), a plurality of sheets 22 combined to form a pad 50, wherein each sheet 22 is removable from pad 50.

The method further including:
in step (h), the electronic file used as a background tracing layer in the web development software 507.

The method further including:
providing graphics editor software;
after step (f), importing the electronic file into the graphics editor software;
using the graphics editor software to modify the electronic file; and,
in step (g), importing the modified electronic file from the graphics editor software into the web development software 507. In some instances it may be necessary to first import the electronic file from the scanner into a commercially available graphics editor computer program (e.g. Photoshop®). After modification in the graphics editor computer program, the modified electronic file is then imported into the web development software 507.

The preferred embodiments of the invention described herein are exemplary and numerous modifications, variations, and rearrangements can be readily envisioned to achieve an equivalent result, all of which are intended to be embraced within the scope of the appended claims.

I claim:

1. A method for developing a web page, comprising:
   - (a) providing a visual display unit having a screen, said screen having a size, an aspect ratio, and a plurality of pixels, a web browser displayable on said screen, said web browser having a (1) a web page display area, and (2) a control and display area;
   - (b) providing an image scanner;
   - (c) providing web development software;
   - (d) providing a tool for developing a web page for display on said screen, said tool including;
     - a pad, said pad including one or more sheets;
     - each sheet of said pad including a page of paper which has the same aspect ratio as the screen of the visual display;
     - a usable area disposed on said sheet, said usable area corresponding with the web page display area of the web browser, said usable area including a grid having a plurality of grid elements wherein said grid elements are shaped and dimensioned to correspond to a predetermined number of pixels, and said useable area is for freehand drawing web page elements; and,
     - an unusable area disposed on said sheet, said unusable area corresponding with the control and display area of the web browser, said unusable area is not available for freehand drawing web page elements;
   - (e) drawing at least one web page element on said usable area of said sheet;
   - (f) using said scanner to convert said at least one web page element to an electronic file;
   - (g) importing said electronic file into said web development software; and,
   - (h) using said web development software to develop the web page.

2. The method of claim 1, further including:
in (d), said sheet having a size which is equal to said size of said screen.

3. The method of claim 1, further including:
in (h), said electronic file used as a background tracing layer in said web development software.

4. The method of claim 1, further including:
providing graphics editor software;
after (f), importing said electronic file into said graphics editor software;
using said graphics editor software to modify said electronic file; and,
in (g), importing said modified electronic file from said graphics editor software into said web development software.

* * * * *